April 4, 1967

A. W. McCARTER 3,312,045

WELLHEAD PRODUCTION UNIT

Filed Aug. 9, 1965

INVENTOR.
Arthur W. McCarter
BY
Fishburn and Gold
ATTORNEYS

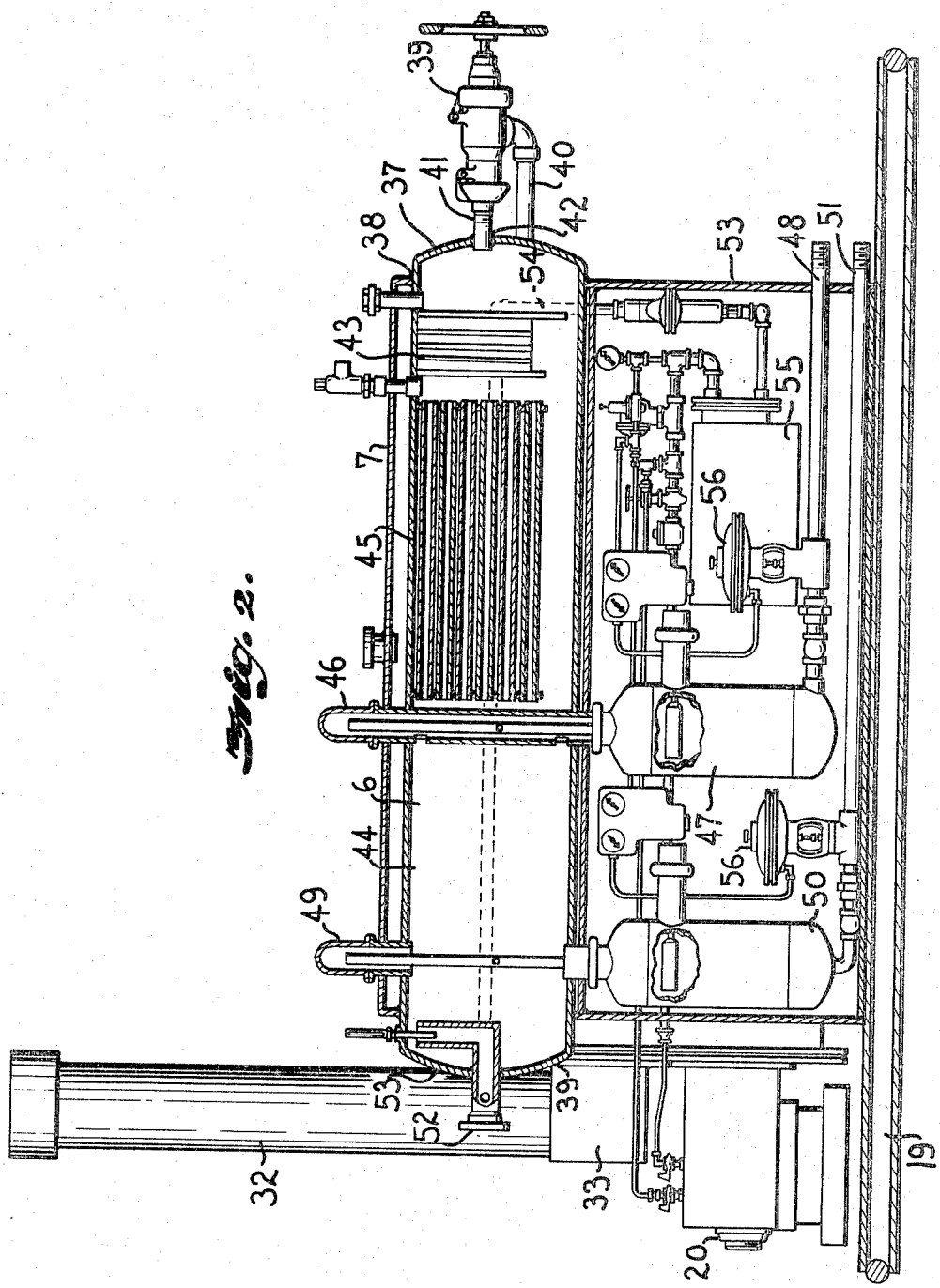

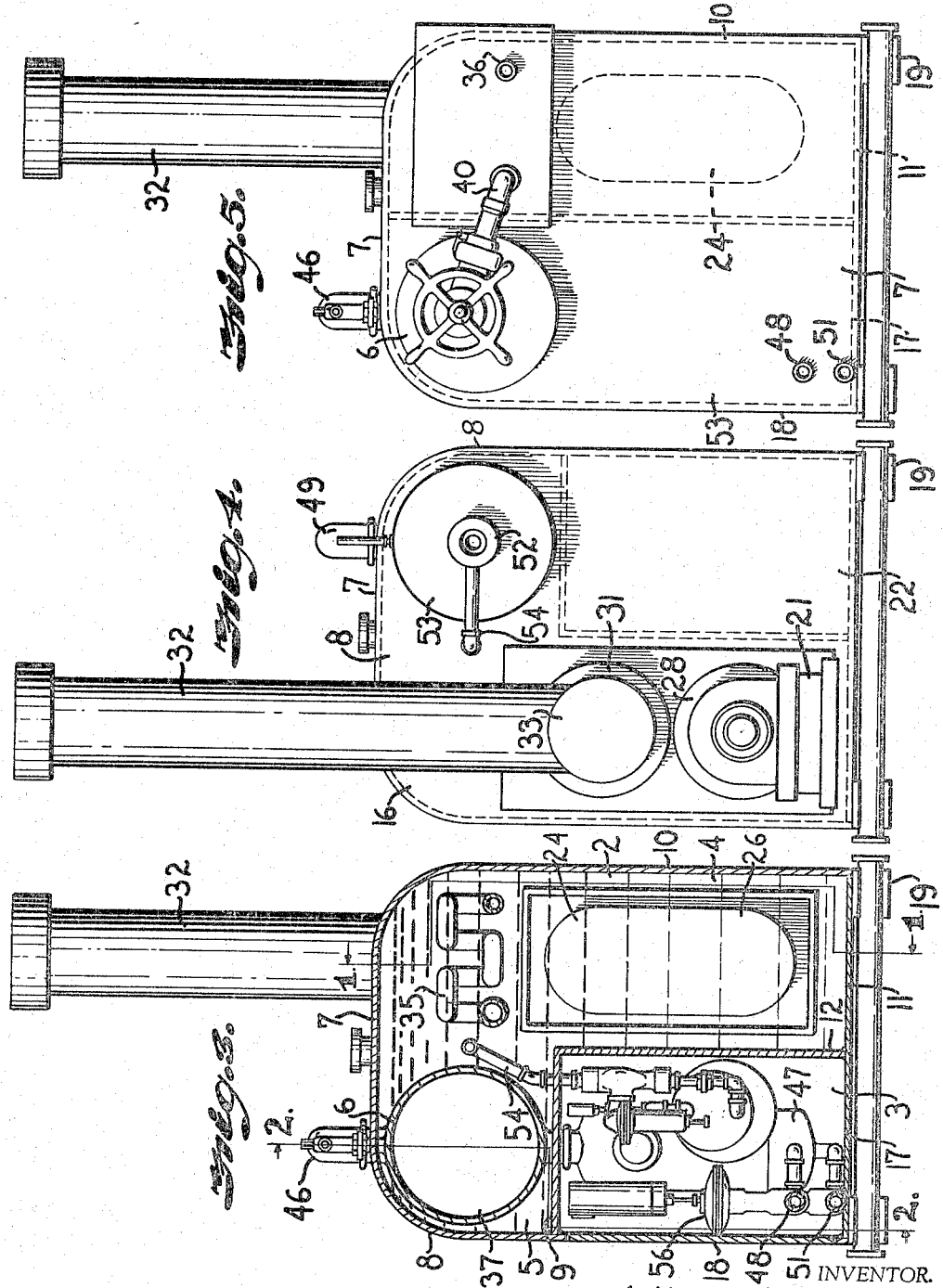

3,312,045
WELLHEAD PRODUCTION UNIT
Arthur W. McCarter, Honolulu, Hawaii, assignor to O'Neill Tank Company, Inc., Great Bend, Kans., a corporation of Kansas
Filed Aug. 9, 1965, Ser. No. 478,322
2 Claims. (Cl. 55—174)

The present invention relates to a wellhead production unit and more particularly, to an improvement in an integral heater-separator combination unit for utilization at the wellhead for separation of water, oil and gas taken from the well.

As the heater-separator unit is located at the wellhead and subjected to subfreezing temperatures, considerable difficulty has been experienced due to freezing of the well products within the unit and due to the temperature rendering the controls of the unit inoperative.

The principal objects of this invention are: to provide a wellhead gas unit of two- or three-phase type wherein the heat is applied to and maintains the liquid in the separator above the hydrate point, yet permits the gas chamber to operate below hydrate formation temperature; to provide a gas condensate unit that is an efficient low temperature extraction unit that eliminates hydrate formation in the separator; to provide an improved heater-separator combination unit for utilization at the wellhead and capable of exposure to subfreezing temperatures without effect on the well products in the unit or the operativeness of the controls for said unit; to provide a heater-separator combination unit wherein the heat generated for the separation process may be efficiently utilized to prevent freezing of the well products in the separator and inoperativeness of the controls of the unit caused by subfreezing temperatures; to provide a new and novel design for a heater-separator combination unit wherein the separating unit may be completely immersed in heated water, to provide a separator-heater combination unit wherein the fire tube of the heater element is so positioned as to effect efficient heat transfer to the control containing area; to provide a novel and efficient heater-separator combination unit wherein the control area is surrounded on two sides by heated water; to provide an improved heater-separator combination unit wherein the control area is novelly designed to provide a large surface area for heat transfer from the heated water of the adjacent water tank; to provide a novel heater-separator combination unit wherein the control area is so arranged that the controls therein are disposed closely adjacent to the walls of the control area common with the heater unit to obtain maximum benefit from the heat transfer from the water tank, thus reducing the temperature in the water tank necessary for maintaining the controls in operating condition, thereby reducing the cost of operation of the unit and causing less vapor drive off from the well product.

Other objects and advantages of this invention will become apparent from the following description taken in connection with the accompanying drawings wherein are set forth by way of illustration and example certain embodiments of this invention.

FIG. 2 is a longitudinal cross-sectional view of the heater-separator combination unit taken along lines 2—2, FIG. 3.

FIG. 3 is an end view of the heater-separator combination unit with the forward input end wall of said unit removed.

FIG. 4 is an elevational view of the rearward output end of the heater-separator combination unit.

FIG. 5 is an elevational view of the forward input end of the heater-separator combination unit.

Figure 1:
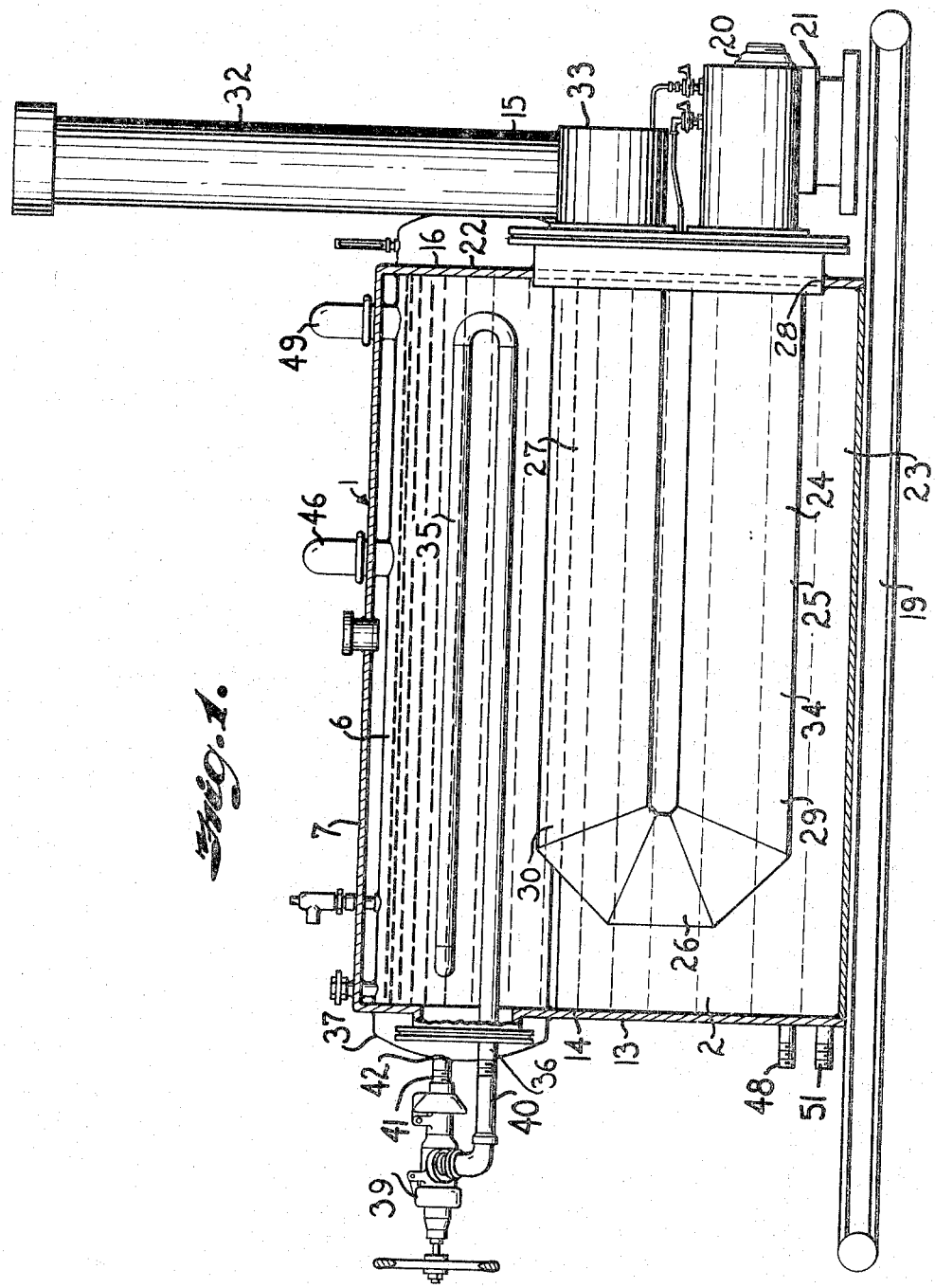
FIG. 1 is a longitudinal cross-sectional view of the heater-separator combination unit taken on lines 1—1 of FIG. 3.

Referring to the drawings in more detail:

The reference numeral 1 generally indicates a wellhead production or gas condensate unit in the form of a heater-separator combination unit embodying the features of this invention. The heater-separator combination unit 1, as illustrated, is comprised of a water tank 2 which in cross section is in the form of an inverted L with a control area or chamber 3 disposed in the angle between the legs of the inverted L being alongside the lower leg portion 4 and below the upper leg portion 5 of water tank 2, and a separator 6 disposed in the upper leg portion 5 of the water tank 2.

The upper leg portion 5 of the inverted L-shaped water tank 2 is defined by a top wall 7, a side wall 8 and a bottom wall 9, the bottom wall 9 being a common heat transfer wall between the control chamber 3 and the water tank 2. The lower leg portion 4 of the water tank 2 is defined by a side wall 10, bottom wall 11 and a second side wall 12. The second side wall 12 provides a second common heat transfer wall between the control chamber 3 and the water tank 2. The upper leg portion 5 and the lower leg portion 4 are both sealed at the forward product input end 13 of the heater-separator combination unit 1 by end wall 14 and at the rearward product output end 15 by end wall 16.

The control area or chamber 3 is disposed longitudinally alongside the water tank 2 beneath leg portion 5 and adjacent leg portion 4. One side wall is defined by side wall 12 of the lower leg portion 4 of the water tank 2 and the upper wall of the chamber 3 is defined by the bottom wall 9 of the upper portion 5 of the water tank 2. The control chamber 3 thus lies adjacent two walls of the water tank 2 which are disposed parallel to the longitudinal axis of the water tank 2 providing a large area of heat transfer surface. This provides a long relatively narrow control chamber 3 in which the necessary controls may be disposed in closely spaced relation to side wall 12 of the lower leg portion 4 of the water tank 2 to obtain maximum benefit from the heat transfer through said wall 12 from the water tank 2. The bottom wall 17 of the control chamber 3 is illustrated as an integral extension of bottom wall 11 of the lower leg portion 4 of the water tank 2. The other side wall 18 of the control chamber 3, as illustrated, may be either hingedly, slidably or otherwise secured to provide access to the control chamber 3. The ends of the control chamber 3 are sealed by end walls 14 and 16 which cover the ends of both the water tank 2 and the control chamber 3.

As illustrated, the entire heater-separator combination unit 1 is mounted on skids 19 but may also be mounted on other suitable supports.

The heating means 20 is comprised of a burner mechanism 21 located at the rearward product outlet end 15 of the heater-separator combination unit 1 and on the exterior side 22 of the end wall 16. The heat is transferred from the burner mechanism 21 to the water 23 in water tank 2 by means of a fire tube 24. The fire tube 24 is comprised of a lower horizontal portion 25, a 180-degree bend portion 26 and an upper horizontal portion 27 whereby the portion 27 is above and vertically spaced from the portion 25. The lower horizontal portion 25 extends from the burner mechanism 21 through the rear wall 16 of unit 1 by means of opening 28 and extends forwardly through the water tank 2 and immersed in water 23 to a point near the forward product input end 13 of unit 1. The 180-degree bend portion 26 of the fire tube 24 extends from the forward end 29 of the lower horizontal portion 25 upward to the forward end 30 of the upper horizontal portion 27 disposed above the lower portion 25. The upper horizontal portion 27 extends rearwardly to an opening 31 which, as illustrated, lies directly above opening 28, the upper horizontal portion 27 extending through opening 31 to the exterior. The upper horizontal portion 27 has an upright stack 32 extending from its rear portion 33. Heat transfer occurs through the walls 34 of the fire tube 24 to water 23.

A preheat coil 35 is located in the water tank 2 immersed in water 23 directly above fire tube 24. The well product is piped into the unit 1 through inflow means 36 into the preheat coil 35 and is heated by heat transfer from water 23. The preheating of the well product in preheat coil 35 results in quicker separation when the well product is injected into the separator 6.

The fire tube 24 is located adjacent the common wall 12 between the control chamber 3 and the water tank 2 and in slightly spaced relation therefrom. The placement of the fire tube in this location effects efficient heating of the control chamber 3. It should be noted that the fire tube 24 is essentially coextensive with wall 12 providing a large area of heat transfer to the control chamber 3. It should also be noted that the fire tube 24 is located below the separator 6 and the preheat coil 35. The water 23 when heated will tend to establish a circulatory movement throughout the tank 2 with the newly heated water circulating upwardly, transferring heat to the preheat coil 35 and the separator 6, cooling and circulating downwardly to be reheated. The placement of the fire tube 24 assures efficient heating of both the preheat coil 35 and the separator 6. Maintaining the separator 6 in an immersed condition with the efficient heat transfer system described herein will prevent the freezing of well products in the separator 6, a problem long experienced in the art. The disposition of the control chamber 3 along the long side wall 12 of the tank adjacent the fire tube 24 will maintain an adequate temperature in the control chamber 3 to retain the controls therein in good operating condition and at the same time, will not require the water within the tank to be heated to such a temperature as will cause excessive vapors to be driven off the well product in the separator 6. The separator 6 has a forward portion 37 extending through opening 38 in the forward wall 14 of unit 1. The forward portion 37 of the separator 6 has a valve mechanism 39 connected to the outflow conduit 40 from preheat coil 35 and further connected to conduit 41 which passes through opening 42 in the forward portion 37 of the separator 6. The valve mechanism 39 serves to control the rate of flow into separator 6. The inlet mist extractor 43 is situated directly inside the separator 6 adjacent the inlet conduit 41 which prevents the entry of mist into the main chamber 44 of the separator 6. A group of tubes 45 lies directly rearward of the inlet mist extractor 43. Directly to the rear of tubes 45 lies the water outlet 46 which removes the water from the separator chamber 44 into the reservoir 47 from which it is, in turn, piped out through the water outlet conduit 48. Reference numeral 49 indicates the oil outlet which communicates with reservoir 50 and, in turn, with conduit 51 for removal of oil from unit 1. The gas outlet is indicated by numeral 52 at the rearward portion or end 53 of separator 6. Due to the variation in specific gravity of the water, oil and gas, components of the well product, said components tend to stratify within the separator chamber 44 and may be individualy removed from their specific strata. The operation of the separator 6 is conventional and well known in the art; therefore, a specific description of this operation will not be given in this application.

The gas may be either removed through outlet 52 or diverted through the gas return conduit 54 to a gas reservoir 55. From reservoir 55, the gas may be piped to the burner to be utilized as fuel or to valves 56 to operate said valves by application of pressure against the valve diaphragm.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. In a wellhead gas production unit,
   (a) a shell having side walls, end walls, a top wall and a bottom wall and a partition coperating therewith to define a water tank having a body of water therein, said partition being substantially coextensive with the side walls of the shell,
   (b) a fire tube heater extending longitudinally into a lower portion of said water tank for heating the water therein,
   (c) a separator in said tank with a major portion immersed in water therein, said separator being above said heater,
   (d) a control containing area in said shell at one side of the partition exteriorly of said water tank with the separator overlying said control containing area, said control area being substantially the length of the separator, said partition being common with the water tank and the control area whereby heat from the water tank is conducted through said partition to the control area to prevent freezing of controls therein,
   (e) a well inflow means extending through said water tank and coupled with said separator for directing a flow of well products through said water tank to said separator,
   (f) and a product outlet means conected to said separator and extending through said control area for removal of well product phases from the separator.
2. In a wellhead gas production unit,
   (a) a shell having side walls, end walls, a top wall and a bottom wall, an L-shaped partition extending between the end walls and connecting one side wall and the bottom wall and cooperating therewith and the top and other side wall to define a water tank having a body of water therein, said partition being substantially coextensive with said side walls, said water tank having a transversely cross-sectional shape of an inverted L with an upper leg portion and a lower leg portion,
   (b) a fire tube heater extending into said water tank for heating the water therein, said fire tube being in said lower leg portion and extending longitudinally of the tank substantially parallel to the side walls,
   (c) a separator in said tank above and laterally spaced from said heater, said separator being in said upper leg portion,
   (d) a control containing area in said shell disposed below the upper leg portion with the separator overlying said control containing area, said partition being a common wall of the lower leg portion of the water tank and the upper leg portion of the water tank with the control area whereby heat from the water tank is conducted through said partition to the control area to prevent freezing of controls therein,

(e) a well inflow means extending through said water tank and coupled with said separator for directing a flow of well products through said water tank to said separator,
(f) a product outlet means connected to said separator and extending through said control area for removal of well product phases from the separator,
(g) and said water tank and control area being substantially the length of the separator, said separator being spaced from the walls of the water tank with a major portion of the separator immersed in water therein.

References Cited by the Examiner
UNITED STATES PATENTS
3,078,648  2/1963  Edmondson _____ 55—202

OTHER REFERENCES

Sauder Tank Co. (Econo-Pak Circular) Economy In Th (title incomplete), Dec. 3, 1962, 3 pages, Sauder Tank Co., Inc. 220 Weaver St., Emporia, Kans.

REUBIN FRIEDMAN, *Primary Examiner.*

R. BURKS, *Assistant Examiner.*